US005158647A

United States Patent [19]

Hurley

[11] Patent Number: 5,158,647
[45] Date of Patent: Oct. 27, 1992

[54] CAPACITOR PAPERS OF FLASH-SPUN SYNTHETIC PULP FIBERS

[76] Inventor: Raymond Hurley, 2 Westfield La., Newville, Pa. 17241

[21] Appl. No.: 749,557

[22] Filed: Aug. 26, 1991

Related U.S. Application Data

[63] Continuation-in-part of Ser. No. 639,278, Jan. 10, 1991, abandoned.

[51] Int. Cl.$^5$ .............................................. D21H 27/12
[52] U.S. Cl. .................................... 162/138; 162/146; 162/148
[58] Field of Search .................... 162/138, 146, 157.2, 162/157.5, 148; 361/324

[56] References Cited

U.S. PATENT DOCUMENTS

| 3,523,061 | 8/1970 | Purvis | 162/138 |
| 3,532,800 | 10/1970 | Wyly et al. | 162/138 |
| 4,519,873 | 5/1985 | Amano et al. | 162/138 |
| 4,833,011 | 5/1989 | Horimoto et al. | 162/157.5 |
| 4,992,141 | 2/1991 | Sullivan | 162/146 |

FOREIGN PATENT DOCUMENTS 411191  7/1974  U.S.S.R. ............... 162/146

Primary Examiner—Peter Chin
Attorney, Agent, or Firm—Richard C. Litman

[57] ABSTRACT

Capacitor grade dielectric tissue and electrolytic separator paper are manufactured on a papermaking machine from flash-spun pulp fibers of a synthetic resin such as polypropylene. The flash-spun synthetic pulp fibers are highly fibrillated and microporous and may be combined with unbleached sulfate woodpulp fibers to produce highly absorbent capacitor tissue and separator paper having chemical, physical and electrical properties which conform to all the essential requirements prescribed by ASTM standards.

8 Claims, No Drawings

CAPACITOR PAPERS OF FLASH-SPUN SYNTHETIC PULP FIBERS

CROSS-REFERENCE TO RELATED APPLICATION

This application is a continuation-in-part of application Ser. No. 639,278 filed Jan. 10, 1991, now abandoned.

BACKGROUND OF THE INVENTION

1. Field of the Invention

The present invention relates generally to electrical papers suitable for use in capacitors which are made from synthetic pulp fibers produced by the flash-spun method. More particularly, this invention pertains to capacitor grade dielectric tissues and electrolytic capacitor paper manufactured on a papermaking machine from flash-spun synthetic pulp fibers.

2. Description of the Prior Art

Commercially available capacitors are basically sealed units containing two metal electrodes connected to external electrical terminals, wherein the electrodes are separated by a single sheet or multiple layers of either plastic film, capacitor paper, or a film-paper combination which is usually interwound convolutely into a roll. Capacitors are usually impregnated under vacuum with a dielectric fluid prior to sealing the units. The dielectric fluid impregnant reduces the possibility of corona discharges caused by gas ionization within the capacitor and may be used to increase the capacitance of the unit.

The predominant material previously used as dielectrics or separators in commercial capacitors has been pure paper fabricated generally from wood pulp on a papermaking machine. This paper has a relatively high degree of physical uniformity and must meet rigid chemical, physical and electrical requirements as set forth by the American Society for Testing and Materials (ASTM). Papers suitable for use as separators in electrolytic capacitors are described in ASTM Specification D 2753. The standard requirements for tissues used as dielectrics in capacitors are set forth in ASTM Specification D 1930. For instance, these capacitor grade tissues must be made solely from unbleached sulfate pulp of coniferous origin in accordance with the well-known "kraft" pulping process and can not contain any coloring agents or other additives.

In electrolytic capacitors the separator paper acts as a mechanical element and contributes to dielectric strength, particularly in the higher voltage range (450 volts and higher). The principal dielectric in this type of capacitor is a very thin coating of oxide on a sheet of metal foil which serves as one of the electrodes, and the fluid impregnant or electrolyte functions as a conductor to enhance current flow. In another type of capacitor, the electrostatic type, the tissues serve primarily as dielectrics, but also function as insulators between the electrodes.

Papers meeting the above specifications have the disadvantage of retaining moisture which results from the papermaking process. It is the necessary removal of this moisture by various drying methods that proved to be both time and energy consuming, resulting in increased manufacturing costs. Also, even under the best manufacturing conditions, these papers may contain minute conductive particles within the limits of the specified requirements which can create leakage paths between the electrodes and may result in shorting out the capacitor. While the use of doubled sheets of paper will generally insure against such current leakage, this further adds to the cost of capacitors.

In recent years, dielectric paper has been gradually replaced in capacitors by synthetic plastic films of polypropylene, polyethylene, and polyesters, for example. While these synthetic films do not require the costly drying step required for capacitor grade paper, they have the disadvantage of not being able to absorb dielectric fluid. Since a dielectric fluid can greatly lengthen the useful life of capacitor units and significantly increase their electrical properties such as capacitance, dielectric strength and dielectric constant, impregnation with this fluid is highly desirable. Moreover, since non-absorbant films do not significantly benefit from impregnation, capacitance is primarily determined by the dielectric constant of the film. Therefore, some capacitors utilize a sheet of paper in combination with a sheet of film, wherein the absorbent paper serves as a wick to hold the dielectric impregnant.

In addition to being non-absorbant, synthetic films allow gas pockets to form between sheets of film when wound tightly together. This can cause corona discharges within the capacitor, creating heat, unnecessary energy loss, and possible dielectric failure. Moreover, films contain weak spots generally caused by resin impurities which may require using multiple sheets of film between electrodes, particularly in high voltage capacitors.

Dielectric paper for use between capacitors electrodes consisting of wood pulp fibers and 2–10% of relatively large-diameter rayon or polyvinyl formal fibers as bulking agents is disclosed in U.S. Pat. No. 3,385,752 to Selke et al. However, the disclosed finished sheet is predominantly of wood origin and would therefore be subject to the same costly moisture removal step associated with the prior art papermaking procedure. Also, the density of this reference paper is relatively high and its porosity is fairly low, making impregnation with a dielectric fluid less efficient.

Another such paper for electrolytic capacitors is described in U.S. Pat. No. 4,914,548 to Kubo et al. This electrolytic paper is made of cellulose fibers provided with organic substituents induced by chemical treatment to improve its swelling degree. While the reference paper has an increased absorption rate and decreased density, the chemical treatment step significantly adds to the manufacturing cost of the paper and the induced substituents may adversely effect the physical and electrical properties of the treated paper.

The prior art further discloses cellulosic products which may contain synthetic fibers for various electrical applications. For instance, U.S. Pat. No. 4,196,044 mentions the use of blends of natural and synthetic fibers in making insulating paper for transformers and U.S. Pat. No. 4,833,011 to Horimoto discloses synthetic pulp fibers of a thermoplastic resin and a high molecular weight surface active agent which may be used for the production of electrical paper. In addition, U.S. Pat. Nos. 4,595,457 and 4,752,355 relate to oil impregnatable pressboards having electrical insulating properties which are made of aromatic polyamide fibers. However, none of the electrical papers described in the present patent literature conform to the critical chemical and physical requirements of industry specifications for capacitor grade tissues and electrolytic capacitor papers. Also, most of the prior art electrical papers contain ingredients, such as coloring agents and other additives, or surface active agents as in the Horimoto patent, which are strictly prohibited by ASTM standards from capacitor grade papers suitable for use as dielectrics or separators.

SUMMARY OF THE INVENTION

It is, accordingly, a primary object of the present invention to provide capacitor papers of synthetic fibers which meet all the standard specifications for kraft dielectric tissues and electrolytic capacitor paper.

It is a further object of the invention to provide a capacitor grade tissue and separator paper made from synthetic pulp fibers which are highly impregnable by a dielectric fluid and fully comply with the chemical, physical and electrical requirements prescribed in ASTM D 1930 and ASTM D 2753, respectively.

It is among the further objects of the present invention to provide electrical papers suitable for use in capacitors which are manufactured on a papermaking machine from synthetic pulp fibers which have been specially processed to produce a highly fibrillated and microporous material. The manufactured capacitor papers have a very high degree of physical uniformity and purity, a fairly high porosity, a comparatively low density, and other required characteristics essential for use as dielectrics and separators in capacitors.

These and other objects are accomplished in accordance with one aspect of the present invention which provides an improved capacitor grade dielectric tissue and electrolytic separator paper made on a papermaking machine from synthetic pulp fibers obtained by flash-spinning. The properties of the capacitor tissue and separator paper of the present invention conform to all the essential requirements prescribed by ASTM standards for these types of capacitor materials.

In accordance with another aspect of the invention, there is provided ASTM standard dielectric tissues and electrolytic capacitor paper made from a mixture of flash-spun synthetic pulp fibers and unbleached sulfate woodpulp fibers. The mixture of combined fibers are processed to a high degree of cleanliness to product highly absorbent sheet materials having the required properties suitable for use as a dielectrics or separators in capacitors.

The foregoing and other features, advantages and objects of the invention may be more fully appreciated by reference to the following detailed description.

DETAILED DESCRIPTION OF THE PREFERRED EMBODIMENTS

In accordance with the present invention, the capacitor grade dielectric tissue and electrolytic capacitor paper are fabricated on a papermaking machine from a composition consisting of pulp fibers of a synthetic resin obtained by the flash-spun method. As suitable synthetic resins, there may be mentioned polymers of olefins, esters, acrylonitriles and acrylic acids, for example. Acrylic acid copolymer resins and polyacrylates are particularly suitable for preparing the present flash-spun pulp fibers. However, crystalline olefin polymers such as polyethylene, polypropylene and copolymers of ethylene and propylene are preferred because their relatively low melting points facilitates processing during the subsequent paper-making procedure.

Flash-spinning methods used to prepare the present synthetic pulp fibers are well known in the art and preferably comprises forming a solution of the crystalline plastic resin in a low boiling solvent at high temperature and pressure. The solution is passed into a specially designed spurting nozzle or spinnerets in which a controlled pressure drop is effected. The solution exits through a small orifice at high shear into a chamber operated at low temperature and about atmospheric pressure to completely evaporate or flash the solvent and form discrete pulp fibers. The pulp fibers are conveyed into deionized water for cleaning, passed through refiners and/or deflakers for additional cleaning and to control fiber length, and then dewatered with conventional equipment. No inorganic fillers or other additives are introduced into the resin solution before or after flash spinning.

The flash-spun synthetic resin pulp fibers produced in accordance the invention are readily dehydrated and fabricated on a fourdrinier machine or equivalent papermaking machine to form a sheet after drying of uniform thickness and density. Optionally, the present sheet may be pressed in conventional calenders in order to either smooth and glaze or further reduce the thickness of the sheet. The visual appearance and dimensions of the resulting sheet closely resemble that made of cellulose pulps, but is clearly distinguishable from films extruded of plastic fibers which consist of smooth rods of solid polymer. The present sheet is characterized as being highly fibrillated, microporous, water-dispersible, having a fairly low density and a relatively large surface area. The physical properties of the dried sheet may vary depending on its particular use. For instance, capacitor grade dielectric tissue may have a minimum thickness of about 4.5 microns and a maximum thickness of about 53 microns, with a density of about 0.50–1.20 $g/cm^3$, preferably in the range of about 0.50–0.70 $g/cm^3$. Electrolytic capacitor paper may have a minimum thickness of about 20 microns and a maximum thickness of up about 112 microns, with a density of about 0.20–0.75 $g/cm^3$. However, both types of the present capacitor papers conform to all the other standard specifications listed in ASTM D 1930 and 2753, respectively.

In an alternate embodiment of the invention, the present flash-spun synthetic pulp fibers may be combined with a natural pulp and fabricated on a papermaking machine to form sheets suitable for use as dielectrics in electrostatic capacitors. To formulate a satisfactory dielectric tissue, the natural pulp component should be obtained solely from unbleached sulfate pulp of coniferous origin made by the conventional "kraft" pulping process. In this process, the coniferous wood is cooked in a solution of caustic soda and sodium sulfide for a period of 4 to 6 hours at a temperature of 165° to 175° C., for example. Prior to fabrication on the papermaking machine, the combined pulp fibers are preferably cleaned with deionized water, diluted to a 0.3% concentration, and heated to about 90°-100° C. for additional cleaning. The finished tissue has a very high degree of cleanliness and contains a large number of voids. These voids go through the sheet in an oblique manner and can not be detected without the aid of a staining agent. Due to its high percentage of voids, this tissue is highly absorbent of a dielectric substance. Thus, it will be possible to produce a certain capacitance using less dielectric and electrode materials which can significantly reduce the size of the capacitor.

In a further embodiment, the flash-spun synthetic pulp fibers produced in accordance with the present invention may be mixed with either unbleached sulfate pulp of coniferous origin or from long, nonwood, unbleached cellulose fibers of stem leaf or seed-hair origin and the mixture is then fabricated on a paper-making machine to form low density sheets suitable for use as separators in electrolytic capacitors. Here it is desirable to obtain separator papers which will swell when placed in an electrolyte to effectively reduce the density of the mixed pulp fibers even further. This swelling ability of both the synthetic and natural pulp fibers tend to reduce the equivalent series resistance (ESR) of electrolytic capacitors.

The finished capacitor papers of the present invention may comprise 20 to 100% by weight of the flash-spun synthetic pulp fibers and 0–80% of the unbleached sulfate pulp of coniferous or similar origin, depending on the particular use. Preferably, the present capacitor papers consist of about 60% by weight of the flash-spun synthetic pulp fibers and about 40% of the coniferous pulp component. It is important that the electrolytic separator papers and dielectric tissues of the present invention be free of all materials or additives prohibited under ASTM standards and be in full compliance with the specifications prescribed therein for these types of capacitor papers.

The following specific examples are given to further illustrate the present invention. All relative proportions are set forth as percentages by weight, density is given in grams per cubic centimeters (g/cm$^3$) and thickness in microns unless otherwise specifically indicated.

EXAMPLE 1

A capacitor grade dielectric tissue is manufactured on a fourdrinier paper machine by mixing about 60% by weight of flash spun polypropylene fibers and about 40% by weight of a kraft-processed, unbleached sulfate coniferous pulp according to the invention as described hereinabove. The finished tissue had a thickness of 28.5 microns and a density of 0.63 g/cm$^3$.

EXAMPLE 2

A sheet was prepared in the manner described in Example 1, except that the finished tissue was passed through a supercalender. The final tissue had a thickness of 26.2 microns and a density of 0.71 g/cm$^3$.

EXAMPLE 3

A tissue was prepared in the manner described in Example 1, except the finished tissue was passed through a hot calender at 400 degrees F. at a pressure of 400 psi to produce a final tissue having a thickness of 26.4 microns and a density of 0.71 g/cm$^3$.

Below are the results of tests on the above tissues, along with typical values for an extruded polypropylene film.

TABLE 1

|  | Ex. 1 | Ex. 2 | Ex. 3 | Film |
|---|---|---|---|---|
| Density | 0.63 | 0.71 | 0.71 | 0.91 |
| Thickness | 57.0 | 52.4 | 52.8 | 50.8 |
| Capacitance (pF) | 1711 | 1656 | 1571 | 1150 |
| Porosity | 1650 | 1800 | 24,000 | 100,000+ |

The porosity measurement is the Gurley porosity, which measures the time required, in seconds, for 100 cc of air to pass through one square inch of material. The capacitance was measured using two plates of area 30.2 square cm, using di-octyl phthalate (DOP) as impregnant and approximately similar-thickness dielectrics.

Table 1 illustrates the ability of the present tissues to greatly increase capacitance when used as dielectrics in electrostatic capacitors by allowing more dielectric fluid to impregnate the capacitor. When tested according to ASTM D 1930, the tissues of Examples 1–3 conform to the essential requirements of capacitor grade dielectric tissues as prescribed therein.

EXAMPLE 4

A mixture of approximately 60% by weight of low density flash spun polypropylene fibers and about 40% by weight of softwood fibers were mixed with deionized water. After limited refining of the mixture, a sheet was produced on a fourdrinier machine having a thickness of 63.5 microns and a density of 0.55 g/cm$^3$.

The above sheet swelled when placed in an electrolyte and when tested according to ASTM D 2753 was found to be in keeping with the essential requirements of this specification for electrolytic grade capacitor papers. When the present sheet was used between electrodes as separators in a electrolytic capacitor, the capacitor had an ESR of 8.0 ohms/micron, measured dry at 80° C. with a Schering bridge at 60 Hz and 250 volts rms.

It should be understood that there may be various changes and modifications of the representative embodiments herein chosen for purposes of illustration without departing from the spirit and scope of the invention. Accordingly, the foregoing illustrations are not to be interpreted as restrictive of the invention beyond that necessitated by the following claims.

I claim:

1. A capacitor grade dielectric tissue having chemical and electrical properties which comply with the requirements prescribed in ASTM D 1930 and having a density of about 0.50 to 1.20 gram per cubic centimeter and a thickness of about 4.5 to 53 microns for use as a dielectric in an electrostatic capacitor, said tissue being fabricated on a papermaking machine from a composition consisting essentially of 20 to 100% by weight of flash-spun pulp fibers of a synthetic resin and 0 to 80% by weight of kraft processed, unbleached sulfate pulp of coniferous origin.

2. The dielectric tissue according to claim 1 wherein the synthetic resin is polyethylene, polypropylene or copolymers of ethylene and propylene.

3. The dielectric tissue according to claim 1 wherein the synthetic resin is polypropylene.

4. The dielectric tissue according to claim 1 wherein the composition consists essentially of about 60% by weight of flash-spun pulp fibers of a synthetic resin and about 40% by weight of kraft processed, unbleached sulfate pulp of coniferous origin.

5. An electrolytic grade capacitor paper having chemical and electrical properties which comply with the requirements prescribed in ASTM D 2753 and having a density of about 0.20 to 0.75 gram per cubic centimeter and a thickness of about 20 to 112 microns for use as a separator in an electrolytic capacitor, said paper being fabricated on a papermaking machine from a composition consisting essentially of 20 to 200% by weight of flash-spun pulp fibers of a synthetic resin and 0 to 80% by weight of unbleached sulfate pulp of coniferous origin or unbleached cellulose fibers of stem, leaf or seed-hair origin.

6. The capacitor paper according to claim 5 wherein the synthetic resin is polyethylene, polypropylene or copolymers of ethylene and propylene.

7. The capacitor paper according to claim 5 wherein the synthetic resin is polypropylene.

8. The capacitor paper according to claim 5 wherein the composition consists essentially of about 60% by weight of flash-spun pulp fibers of a synthetic resin and about 40% by weight of unbleached sulfate pulp of coniferous origin or unbleached cellulose fibers of stem, leaf or seed-hair origin.

* * * * *